United States Patent [19]

Ernest et al.

[11] 4,303,552

[45] Dec. 1, 1981

[54] DIESEL EXHAUST CATALYST

[75] Inventors: Michael V. Ernest, Baltimore; William A. Welsh, Clarksville, both of Md.

[73] Assignee: W. R. Grace & Co., New York, N.Y.

[21] Appl. No.: 153,502

[22] Filed: May 27, 1980

[51] Int. Cl.³ .................. B01J 21/04; B01J 21/06; B01J 23/64
[52] U.S. Cl. .................. 252/465; 252/466 PT; 252/467; 252/468; 252/469; 252/470; 423/213.2; 423/213.5
[58] Field of Search ............. 252/465, 466 PT, 467, 252/470, 468, 469; 423/213.2, 213.5

[56] References Cited

U.S. PATENT DOCUMENTS

| | | | |
|---|---|---|---|
| 3,259,453 | 7/1966 | Stiles | 423/213.5 |
| 3,945,947 | 3/1976 | Sakai et al. | 252/466 B |
| 4,105,590 | 8/1978 | Koberstein et al. | 252/464 |
| 4,162,235 | 7/1979 | Acres et al. | 252/462 |

Primary Examiner—W. J. Shine
Attorney, Agent, or Firm—Mark T. Collins

[57] ABSTRACT

A catalyst which is particularly useful in the treatment of diesel exhaust emissions is described. The catalyst comprises a mixture of a supported noble metal and/or chromium component and a bulk first transition series, silver, and/or hafnium component. The supported component catalyzes hydrocarbon conversions and the bulk component catalyzes combustion of carbon particulates in diesel exhaust gases.

24 Claims, No Drawings

DIESEL EXHAUST CATALYST

The present invention relates to catalyst compositions suitable for promoting chemical reactions. More particularly, the invention concerns catalysts for the control of diesel exhaust emissions.

Automobile manufacturers have recently increased the use of diesel engines in passenger cars because of their improved fuel economy over gasoline engines. Although diesel engines have relatively low carbon monoxide and hydrocarbon emissions compared to gasoline engines, they emit very substantial quantities of particulates. In a recent study, particulate emissions from two diesel cars were found to be on the order of 50 to 80 times their gasoline counterparts operating on unleaded gasoline. Diesel particulate emissions are evidenced by the occasional visible smoke discharges that occur during acceleration or maximum power operation.

The potential effects of particulate emissions on air quality and public health may be the greatest drawback of diesel powered cars. The hydrocarbons in diesel exhaust emissions are quite biologically reactive and condense on the particulates. The particulates consist largely of very small and light carbon particles and may be inhaled after emission to the atmosphere.

In conventional methods for particulate removal from diesel exhaust emissions, the particulates are physically trapped and substantial quantities accumulate over quite short periods of time. The particulates tend to plug the trapping device and restrict exhaust gas flow so that the trapping device must be frequently replaced or cleaned, for example, by heating the device and incinerating the trapped particulates. The large quantities of the very small and light particulates in diesel exhaust present substantial difficulties in reducing the particulates that escape to the atmosphere while avoiding plugging of the treatment device.

The catalyst composition of the present invention comprises catalytically-effective amounts of at least one catalytic material supported on a porous refractory inorganic oxide and at least one bulk catalytic material. The supported material is selected from the group consisting of a noble metal, chromium, and catalytically active compounds thereof. The bulk material is selected from the group consisting of an element of the first transition series, silver, hafnium, and catalytically-active compounds thereof.

The low exhaust temperatures, low carbon monoxide concentrations (which provide little of the heat that is required to accelerate the oxidation reactions), and the catalyst deactivating particulates make it difficult for a catalyst to function effectively in the treatment of diesel exhaust emissions. The catalysts of this invention surprisingly achieve significant reductions in particulate emissions and also control of other diesel exhaust emissions under these difficult operating conditions and eliminate the need for frequent replacement or cleaning and incineration equipment.

The bulk material of the present invention is unexpectedly effective in catalyzing combustion of carbon particulates and the supported material has unexpectedly high activity for the catalytic oxidation of the hydrocarbons in diesel exhaust. When the composition is deposited on a ceramic or metal substrate, the supported material improves the adhesion of the dense, highly crystalline bulk material to the substrate and prevents loss of activity that would otherwise occur if the bulk material became dislodged from the substrate under the mechanical and thermal stresses and high gas velocities present in a diesel powered vehicle exhaust system.

The supported component of the present invention is a hydrocarbon oxidation catalyst that does not interact with the support to form catalytically inactive compounds. Such catalyst materials are selected from the group consisting of a noble metal, chromium, and catalytically active compounds thereof. The supported material may be in the form of the metal, the metal oxide, or other catalytically active compounds of the metal such as the sulfide. The noble metals are gold, silver, and the platinum group metals of platinum, palladium, rhodium, ruthenium, iridium, and osmium. When mixtures of a noble metal or metal oxide and chromium or chromium oxide are used, the noble metal component generally comprises from about 0.5 to about 10 percent and the chromium component generally comprises from about 5 to about 25 percent of the total weight of the supported material. The support constitutes the balance.

Platinum, palladium, and chromium oxide are preferred because of their high hydrocarbon oxidation activity at relatively low temperatures. Chromium oxide is highly preferred because it also is especially effective in the combustion of diesel exhaust particulates. In an especially preferred embodiment of this invention, the catalyst material on the support comprises a platinum group metal such as platinum, palladium, or mixtures thereof and chromium oxide. The combination of the platinum group metal and chromium oxide catalyzes carbon combustion at a significantly lower temperature than either component alone.

The support for the first component of the catalyst of this invention is a porous, refractory inorganic oxide. These oxides have a high total pore volume and surface area. Generally, the surface area of the refractory oxide is at least about 75 square meters per gram, preferably from about 100 to about 300 square meters per gram, and the total pore volume is at least about 0.4 cubic centimeters per gram, preferably from about 0.5 to about 2.0 cubic centimeters per gram. The surface areas referred to throughout this specification are determined by the nitrogen BET method. The total pore volumes are determined by adding water to a powder sample to the point where incipient wetness just occurs.

Generally, the refractory oxide is composed predominantly of oxides of one or more metals of Groups II, III, and IV having atomic numbers not exceeding 40. Suitable porous refractory inorganic oxides can be prepared by dehydrating, preferably substantially completely, the hydrate form of the oxide by calcination generally at temperatures of about 150° to about 800° C. for periods of from about ½ to about 6 hours. The preferred refractory oxide is a transitional alumina, such as chi, rho, kappa, gamma, delta, eta, and theta aluminas, especially gamma alumina. A particularly preferred gamma alumina may be prepared by calcining a boehmite-pseudoboehmite intermediate alumina prepared in accordance with U.S. Pat. No. 4,154,812 of Sanchez et al. at a temperature of about 650° C. for about 1 hour. Other suitable oxides include, for example, calcined beryllia, zirconia, magnesia, and mixtures of metal oxides such as boria-alumina, silica-alumina, and the like.

The noble metal and/or chromium component may be deposited on the refractory oxide support in any convenient manner from aqueous or organic solutions of a metal compound or complex or a slurry of the metal or metal oxide. Generally, deposition of this component is effected by impregnating a refractory oxide powder with an aqueous solution of a water soluble, thermally decomposable inorganic salt or complex of the particular metal or metals and drying the impregnated powder at a temperature of from about 90° to about 250° C. for about 2 to about 20 hours. The dried powder may then be calcined at a temperature of from about 300° to about 700° C. for about 1 to about 3 hours. The calcination can be conducted in air or other oxidizing gases or in a reducing gas such as hydrogen if the metal form of the catalyst is desired. Typical thermally decomposable water soluble metal compounds include the acetate, chloride, and nitrate. Preferably, the platinum group metal component is deposited in the form of a sulfito complex as described in U.S. Pat. No. 3,850,847 of Graham et al. to enhance its dispersion and surface area. Generally, the impregnation is carried out to incipient wetness to provide the desired amount of this component in the mixture.

The bulk or unsupported material of this invention is a catalyst that is active in the combustion of carbon. These bulk materials are highly crystalline and thus do not adhere well to ceramic or metal substrates. Generally, the bulk component of this invention has a surface area of less than about 10 and preferably not greater than about 1 square meter per gram and essentially no water pore volume.

The bulk material is selected from the group consisting of an element of the first transition series, silver, hafnium, and catalytically-active compounds thereof. As used herein, the elements of the first transition series are vanadium, chromium, manganese, iron, cobalt, nickel, copper, and zinc. The material may be present in the mixture in the form of the metal, the metal oxide, mixed metal oxides, such as copper chromite or a perovskite, or other catalytically-active metal compounds. Copper oxide and chromium oxide are preferred.

The base metal oxide may be prepared by thermal decomposition of a compound of the desired metal. Typically, the acetate, nitrate, carbonate, hydroxide, or chloride is heated at a temperature of from about 450° to about 800° C. for a period of from 1 to about 5 hours.

The composition of this invention comprises a mixture of catalytically-effective amounts of the supported material and the bulk material. Generally, each component may comprise from about 25 to about 75 percent and preferably from about 40 to about 60 percent by weight of the mixture with the other component as the balance of the mixture. Typically, the components are used in a one to one weight ratio.

In order to prepare the mixture of the composition of this invention, the components are generally reduced in size to finely divided powders. Generally, the powders may have a weight median particle diameter of less than about 50 microns and preferably of from about 1 to about 10 microns. Preferably, the components are separately reduced in size in order to minimize interaction of the bulk components with the refractory inorganic oxide. Suitable size reduction techniques include wet or dry ball milling, fluid energy milling, and sand milling. The components are then mixed in the desired weight ratios and formed into a substantially homogeneous mixture by conventional blending techniques.

The mixture may be deposited on a substrate or used in finely divided form or in the form of shaped articles prepared by pelleting, extruding, and the like. The substrate may be any conventional catalyst support which traps diesel exhaust particulates, for example, as a result of inertial impact or electrostatic attraction. Shaped refractory inorganic oxide articles, such as spheres or cylinders, may be used as the substrate. Preferably, the substrates are structures of relatively large size such as ceramic monolithic structures, ceramic foams, or wire meshes.

The substrates may be formed of metal or ceramic materials of sufficient strength and mechanical stability for use in the catalytic reactor. The metal may be, for example, steel, stainless steel, aluminum, copper, nickel, or titanium. Suitable refractory or ceramic materials include refractory metal oxides, e.g., alpha alumina, magnesia, and silica, and refractory metal silicates and carbides.

The composition may be deposited on the substrate by conventional methods, such as dipping or spraying. For example, an aqueous slurry of each component is separately prepared by wet ball milling in order to avoid interaction of the bulk component and the support. The slurries are then combined in the desired ratio in the presence of acid which aids in the adhesion of the composition to the substrate. The substrate is dipped into the combined slurry and dried at a temperature of from about 90° to about 250° C. for about 1 to about 4 hours to remove the solvent and deposit the solids in an adherent film on the substrate. The dried substrate may be calcined at from about 250° to about 800° C. for about 1 to about 4 hours.

The amount of the composition that is coated on the substrate depends on economics, size limitations, and design characteristics. The composition generally comprises about 1 to about 50 and preferably from about 2 to about 30 percent based upon the weight of the substrate.

In employing the composition of this invention in the treatment of diesel exhaust gases, the gases are contacted with a substrate coated with the composition. The particulates are trapped and combusted along with the hydrocarbons in the exhaust. The catalyst is self-cleansing by continuous combustion of particulates and hydrocarbons. The accumulated particulate deposits may be periodically removed by throttling the engine to reduce the air flow with fuel flow remaining constant and increase the exhaust temperature. At the resulting higher exhaust temperatures, the combustion of the particulates will be achieved quite rapidly in the presence of the catalyst of this invention.

In addition to the treatment of diesel exhaust emissions, the catalysts of this invention may be used, for example, to catalyze the combustion of particulates from other mobile power plants as well as stationary sources which utilize fuels which produce pollutants on combustion.

This invention is illustrated by the following examples in which all parts and percentages are by weight unless otherwise indicated.

EXAMPLES 1-2

A catalyst composition of this invention was prepared and deposited on turbulent flow ceramic monoliths as follows.

A boehmite-pseudoboehmite intermediate hydrated alumina powder prepared in accordance with the process of U.S. Pat. No. 4,154,812 of Sanchez et al. was calcined in air at 649° C. for one hour. The resulting gamma alumina had a total pore volume of 1.56 to 1.68 cubic centimeters per gram and a total volatiles content (loss in weight after heating for 1 hour at 954° C.) of 1.8 to 3.3 percent.

3000 grams of the calcined alumina powder were impregnated with 840 milliliters of a solution of 260.29 grams of chromic acetate in 800 milliliters of deionized water and 5 milliliters of glacial acetic acid. The impregnated powder was allowed to dry in air for ½ hour and then dried for 16 hours at 135° C. The powder was screened through a 20 mesh J.S. Standard Sieve and calcined at 843°–871° C. for one hour. The calcined chromia-alumina powder had a BET surface area of 109 square meters per gram and contained nominally 10 weight percent chromia.

500 grams of this powder were impregnated with a mixed solution of platinum and palladium prepared by bubbling sulfur dioxide gas at 3 millimoles per minute into 500 milliliters of deionized water for 6.85 minutes and adding 5.398 grams of palladium nitrate solution containing 90.02 grams of palladium per kilogram of solution. 106.33 grams of $(NH_4)_6Pt(SO_3)_4$ solution containing 91.4 grams of platinum per kilogram of solution and 2.5 grams of dibasic ammonium citrate were then added to the solution. The total volume of the solution was increased to 760 milliliters by addition of deionized water. The powder was impregnated with this volume of solution, air dried for one half hour, and then oven dried for 16 hours at 275° F. (135° C.). The powder was finally activated in air for one hour at 1000° F. (538° C.). The powder nominally contained 2 percent of platinum and palladium in a 20 to 1 weight ratio.

1055 grams of copper oxide freshly prepared by decomposing cupric acetate for 3 hours at 538° C. in a muffle furnace and 1055 grams of the chromia-alumina powder were separately ball milled with deionized water for 16 hours. The resulting slurries were combined in a 1 to 1 ratio (solids basis) and homogenized. The pH of the combined slurry was adjusted to 3.5 with nitric acid and the solids content of the slurry was adjusted with deionized water to 26 to 27 percent. The slurry was coated on turbulent flow ceramic monoliths having nominal ¼ inch cells. Another slurry was prepared at a solids content of 22 to 23 percent and coated on turbulent flow ceramic monoliths having nominal ⅛ inch cells. The excess slurry was blown out of the coated monoliths and they were dried at 135° C. for 16 hours and activated for 1 hour at 399° C. The coating pickups and nominal platinum group metal loadings are summarized in the following table.

TABLE

| Coating Pickup % | Calculated troy ounces Pt/Pd |
|---|---|
| ¼ inch cell size monoliths | |
| 9.42 | 0.0193 |
| 10.48 | 0.0218 |
| 9.60 | 0.0197 |
| 9.12 | 0.0187 |
| 9.13 | 0.0183 |
| 9.49 | 0.0180 |
| 9.24 | 0.0166 |
| 9.67 | 0.0172 |
| 11.40 | 0.0220 |
| ⅛ inch cell size monoliths | |
| 8.75 | 0.0180 |
| 9.52 | 0.0190 |
| 8.66 | 0.0180 |
| 9.60 | 0.0180 |
| 8.85 | 0.0182 |
| 10.18 | 0.0211 |
| 8.12 | 0.0169 |

TABLE-continued

| Coating Pickup % | Calculated troy ounces Pt/Pd |
|---|---|
| 7.00 | 0.0142 |
| 10.00 | 0.0207 |

Each of the monolithic catalysts was found to be highly effective in the treatment of diesel exhaust emissions.

What is claimed is:

1. A composition comprising a mixture of catalytically-effective amounts of a supported material comprising a noble metal and chromium or catalytically-active compounds thereof, said material supported on a porous refractory inorganic oxide, and at least one bulk material selected from the group consisting of an element of the first transition series, silver, hafnium, and catalytically-active compounds thereof, said mixture deposited on a substrate.

2. The composition of claim 1 in which the inorganic oxide comprises alumina or zirconia.

3. The composition of claim 1 in which the nobile metal comprises a platinum group metal.

4. The composition of claim 1 in which the supported material comprises a nobile metal and chromium oxide.

5. The composition of claim 1 in which the noble metal comprises platinum, palladium, or mixtures thereof.

6. The composition of claim 1 in which the supported material comprises platinum and chromium oxide supported on a transitional alumina.

7. The composition of claim 6 in which the transitional alumina comprises gamma alumina.

8. The composition of claim 1 in which the supported material comprises from about 25 to about 75 percent by weight of the mixture.

9. The composition of claim 1 in which the supported material comprises from about 40 to about 60 percent by weight of the mixture.

10. The composition of claim 1 in which the bulk material comprises copper oxide or chromium oxide.

11. The composition of claim 1 in which the bulk material comprises copper oxide.

12. The composition of claim 1 in which the bulk material comprises a mixed metal oxide.

13. The composition of claim 1 in which the bulk material has a surface area of less than about 10 square meters per gram.

14. The composition of claim 1 in which the bulk material has a surface area of not greater than about 1 square meter per gram.

15. The composition of claim 1 in which the bulk material has essentially no water pore volume.

16. The composition of claim 1 in which the bulk material comprises from about 25 to about 75 percent by weight of the mixture.

17. The composition of claim 1 in which the bulk material comprises from about 40 to about 60 percent by weight of the mixture.

18. The composition of claim 1 in which the substrate comprises a ceramic or metal material capable of trapping diesel exhaust particulates.

19. The composition of claim 1 in which the substrate comprises a ceramic monolithic structure, a ceramic foam, or a wire mesh.

20. A diesel exhaust catalyst comprising a mixture of from about 40 to 60 weight percent of a supported material comprising a platinum group metal and chromium oxide, supported on a transitional alumina and from about 40 to 60 weight percent of a bulk material comprising copper oxide, said mixture deposited on a substrate comprising a ceramic monolith, a ceramic foam, or a wire mesh.

21. The catalyst of claim 20 in which the platinum group metal comprises platinum, palladium, or mixtures thereof.

22. The catalyst of claim 21 in which the supported material comprises from about 0.5 to about 10 weight percent platinum, from about 5 to about 25 weight percent chromium oxide, and the balance the transitional alumina.

23. The composition of claim 1 which is prepared by combining a slurry of the supported material and a slurry of the bulk material, depositing the combined slurry on the substrate, and drying the substrate.

24. The catalyst of claim 20 which is prepared by combining a slurry of the supported material and a slurry of the bulk material, depositing the combined slurry on the substrate, and drying the substrate.

* * * * *